US006978384B1

(12) United States Patent
Milliken

(10) Patent No.: US 6,978,384 B1
(45) Date of Patent: Dec. 20, 2005

(54) METHOD AND APPARATUS FOR SEQUENCE NUMBER CHECKING

(75) Inventor: Walter Clark Milliken, Dover, NH (US)

(73) Assignees: Verizon Corp. Services Group, Inc., New York, NY (US); BBNT Solutions LLC, Cambridge, MA (US)

( * ) Notice: Subject to any disclaimer, the term of this patent is extended or adjusted under 35 U.S.C. 154(b) by 883 days.

(21) Appl. No.: 09/955,830

(22) Filed: Sep. 19, 2001

Related U.S. Application Data

(60) Provisional application No. 60/233,699, filed on Sep. 19, 2000.

(51) Int. Cl.$^{7}$ ........................ G06F 11/30; G06F 12/14; H04L 9/00; H04L 9/32

(52) U.S. Cl. ...................... 713/201; 713/160; 713/162; 709/227; 709/228

(58) Field of Search ................................ 713/160, 162, 713/177, 151, 201; 380/262; 708/212; 709/227, 709/228

(56) References Cited

OTHER PUBLICATIONS

S. Kent, R. Atkinson; RFC 2406 IP Encapsulating Security Payload (ESP), Nov. 1998.*

* cited by examiner

*Primary Examiner*—Gilberto Barron
*Assistant Examiner*—Kristin M Derwich
(74) *Attorney, Agent, or Firm*—Leonard C. Suchyta, Esq.

(57) ABSTRACT

Methods and systems are provided for sequence number checking. Sequence numbers of data packets are compared to a "sliding" window. The sliding window indicates a range of sequence numbers considered valid (or invalid). The size of the sliding window may be a particular value or varied. If a sequence number is "below" the sliding window, then it may be considered invalid. If a sequence number is within the sliding window, then it may be further checked to determine if a duplicate sequence number has been received. If a sequence number is "above" the sliding window, then it may be considered valid and the sliding window is advanced. The sliding window and sequence numbers are processed using multiple level bitmaps, which indicate a historical state of sequence numbers received. Furthermore, the multiple level bitmaps may comprise summary bits to summarize a state of subsequent bits.

14 Claims, 6 Drawing Sheets

METHOD AND APPARATUS FOR SEQUENCE NUMBER CHECKING

REFERENCE TO RELATED APPLICATIONS

This application claims priority from prior provisional application Ser. No. 60/233,699, filed Sep. 19, 2000 for "METHOD AND APPARATUS FOR SEQUENCE NUMBER CHECKING" which is hereby incorporated in its entirety by reference.

FIELD OF THE INVENTION

This invention relates generally to protecting data in a computer network. In particular, it relates to apparatus and methods for sequence number checking.

BACKGROUND OF THE INVENTION

With the rapid growth of the Internet, wide sharing of information and applications has become possible. However, with these opportunities, security has also become a major concern. For example, when connecting to the Internet, a private network may be exposed to over 50,000 unknown networks and all their users. Thus, confidential information on a private network may be exposed to unscrupulous parties when connected to a public network such as the Internet.

One type of common method used for obtaining confidential information is a replay attack. In a replay attack, an attacker copies confidential communications between two private parties. The attacker then replays the information to one or both of the parties in the hope that confidential information will be revealed, e.g., passwords or cryptographic keys.

A technique for protecting against a replay attack is to assign each packet a sequence number. For example, the Internet protocol security protocol ("IPsec") and encapsulating security payload ("ESP") protocol use a 32-bit sequence number assigned to each data packet. The sequence number is reset each time communications are established, e.g., during the setup of a security association. RFC-2401, R. Atkinson, the Internet Society (1998), titled "Security Architecture for IP," describes, inter alia, IPsec and is incorporated herein by reference in its entirety. IPsec under RFC 2401 specifies that the window size for sequence checking must be a minimum of 32, and should be 64. Thus, IPSec permits packets to arrive out of order, e.g., up to 63 packets away from the highest-numbered packet yet received.

The typical causes of packets to arrive out of order include parallel processing paths inside routers or switches, traffic flows split among multiple links with differing delays, and routing "hiccups" where a flow shifts from one path to another with a different end-to-end delay. Changes in a route can easily induce changes in end-to-end delay of tens of milliseconds. For example, if the change involves a switch from a satellite link to a terrestrial one, the delay delta can even be in the 100 ms range. Unfortunately, these path-switching changes in end-to-end delay can significantly impact window-based sequence-checking algorithms such as those used by IPsec, especially in high-bandwidth flows.

Problems may arise when a flow's path changes from a route with a large end-to-end delay (possibly due to heavy congestion) to a route with a significantly smaller end-to-end delay. In this case, older packets from the prior route may continue to arrive long after newer packets arriving on the new route. Worse, in a high-bandwidth flow, there may be many packets in transit on both routes. For example, with a 100 Mb/s flow of 64-byte plaintext packets, a path with an end-to-end delay of 50 ms requires about 10,000 packets in flight. A decrease in path length of 5 ms would result in a 5 ms period of sequence number discontinuities affecting approximately 2000 packets (1000 packets on the old route intermixing with 1000 on the new route). Anti-replay algorithms must discriminate effectively between actual replay attacks and common network behaviors like path re-routing. This requires that the window size be based on reasonable expectations for packet re-ordering.

For window sizes of up to a few hundred bits, the RFC-2401 algorithm can make use of hardware parallelism to run in O(1) time using simple shift registers, or a large shift register combined with a few memory accesses. Unfortunately, the processing of sequence numbers, as currently described in RFC-2401 is inadequate, especially for high-bandwidth flows. For example, the RFC-2401 window slide algorithm requires O(N) operations, where N is the window size. Thus, the memory operations required under the window slide algorithm of RFC-2401 increases linearly based on window size. Furthermore, the algorithm described in RFC-2401 scales poorly in performance to larger window sizes required by such flows.

SUMMARY OF THE INVENTION

To overcome these and other shortcomings in the prior art it is, therefore, desirable to have methods and apparatus for protecting data which check sequence numbers. In accordance with an embodiment of the present invention, a sequence number checker for protecting data in a computer network comprises: a bit map memory storing a first multiple level bit map representing a first sequence number of a first packet by the sequence number checker; and a processor to compute a second multiple level bit map representing a second sequence number of a second packet received by the sequence number checker subsequent to the first packet, the second multiple level bit map being compared to the first multiple level bit map to produce a result indicating actions to be performed on the second packet.

In accordance with another embodiment of the present invention, a method of maintaining a window of valid sequence numbers comprises: setting a bottom value and a top value to define a window; receiving a sequence number for a packet; comparing the sequence number to the window; setting a new top value equal to the sequence number, if the sequence number is greater than the top value; and setting a new bottom value based on the new top value.

In accordance with another embodiment of the present invention, a method for checking sequence numbers comprises: receiving a sequence number for a packet; converting the sequence number to a first multiple level bit map; retrieving a second multiple level bit map stored in a bit map memory; dividing the first multiple level bit map into a first plurality of summary bits; dividing the second multiple level bit map into a second plurality of summary bits; and comparing the first and second plurality of summary bits to produce a result indicating validity of the sequence number.

In accordance with another embodiment of the present invention, an apparatus for maintaining a window of valid sequence numbers comprises: means for setting a bottom value and a top value to define a window; means for receiving a sequence number for a packet; means for comparing the sequence number to the window; means for setting a new top value equal to the sequence number, if the sequence number is greater than the top value; and means for setting a new bottom value based on the new top value.

In accordance with yet another embodiment of the present invention, an apparatus for checking sequence numbers comprises: means for receiving a sequence number for a packet; means for converting the sequence number to a first multiple level bit map; means for retrieving a second multiple level bit map stored in a bit map memory; means for dividing the first multiple level bit map into a first plurality of summary bits; means for dividing the second multiple level bit map into a second plurality of summary bits; and comparing the first and second plurality of summary bits to produce a result indicating validity of the sequence number.

Additional benefits of the invention will be set forth in part in the description which follows, and in part will be obvious from the description, or may be learned by practice of the invention. Features of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DETAILED DESCRIPTION

Methods and systems consistent with the present invention relate to sequence number checking, e.g., to protect data in a computer network. Sequence numbers of data packets are compared to a "sliding" window. The sliding window indicates a range of sequence numbers considered valid (or invalid) and may be advanced as incoming data packets with new sequence numbers are received. The size of the sliding window may be a particular value or varied for a particular security association based upon a variety of factors, such as, the expected data rate (or packet rate) or the expected maximum delay change associated with a packet reordering event in a network. If a particular sequence number is "below" the sliding window, then the sequence number may be considered invalid, e.g., for being too old. If a particular sequence number is within the sliding window, then the sequence number may be further checked to determine if a duplicate sequence number has already been received, e.g., to detect a possible replay attack. If a particular sequence number is "above" the sliding window, then the sequence number may be considered valid and the sliding window is advanced. The sliding window and sequence numbers are processed using multiple level bitmaps, which indicate a historical state of sequence numbers received from incoming data packets. Furthermore, the multiple level bitmaps may comprise summary bits to summarize a state of subsequent bits in the bitmap.

Reference will now be made in detail to implementations consistent with the invention, examples of which are illustrated in the accompanying drawings. Wherever possible, the same reference numbers will be used throughout the drawings to refer to the same or like parts.

Figure 1:
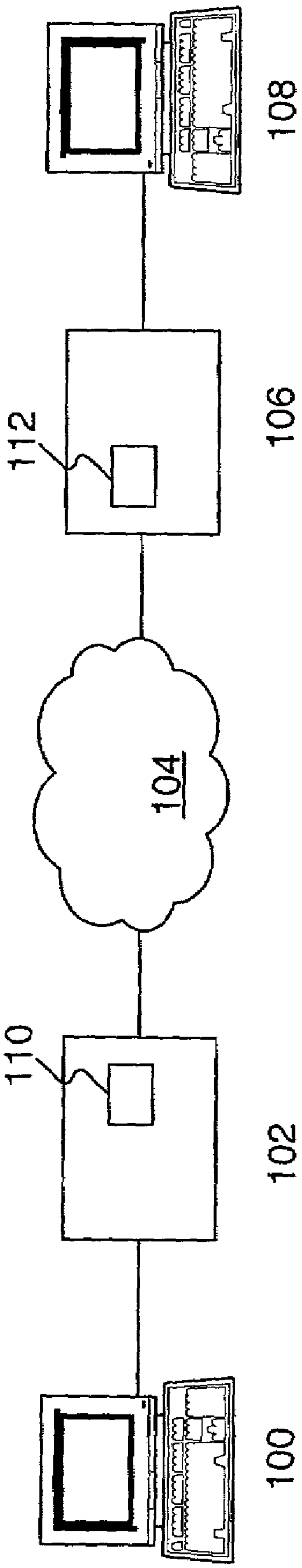
FIG. 1 shows an overall diagram of a system, including two hosts communicating over a public network in which the present invention may be practiced.

FIG. 1 shows an overall diagram of a system, including two hosts communicating over a public network in which the present invention may be practiced. In particular, a host 100 is coupled to a first security device 102. First security device 102 is coupled to a network 104, e.g., the Internet, to a second security device 106 and host 108.

Hosts 100 and 108 may be a wide variety of devices. For example, hosts 100 and 108 may be devices such as personal computers, workstations, and servers. Hosts 100 and 108 may also be one or more devices connected together, e.g., via a local area network. However, any device or combination of devices which act as a source or destination of data packets may be a host in accordance with the principles of the present invention.

Security devices 102 and 106 secure the communications between hosts 100 and 108 over network 104. Security devices 102 and 106 may be implemented as a separate hardware device, such as a security gateway, firewall or link encryptor, as software integrated within a host (e.g., hosts 100 and 108), or as software integrated within a network device, such as a router (not shown) or a combination thereof. Security devices 102 and 106 may utilize a wide variety of algorithms and protocols for securing communications, such as IPsec.

IPsec is a framework of open standards developed to secure communications across an IP network, such as the Internet. IPsec works in conjunction with ESP to provide a wide variety of security services. ESP is used to provide confidentiality, data origin authentication, connectionless integrity, an anti-replay service, and limited traffic flow confidentiality. The set of services implemented for secure communications is specified by a "security association" (SA).

SAs contain information required for execution of various network security services, such as the IP layer services (such as header authentication and payload encapsulation), transport or application layer services, or self-protection of negotiation traffic. For example, SAs may define payloads for exchanging key generation and authentication data. Thus, SAs provide a framework for transferring key and authentication data which is independent of the key generation technique, encryption algorithm and authentication mechanism.

ESP requires that SAs support an anti-replay service through the use of sequence numbers. Under the anti-replay service, security devices 102 and 106 verify that each packet contains a sequence number that is not a duplicate of a sequence number of any other packets already received during the life of an SA. In one embodiment consistent with the principles of the present invention, security devices 102 and 106 further comprise sequence checkers 110 and 112 respectively to support the anti-replay service specified by IPsec.

Figure 2:
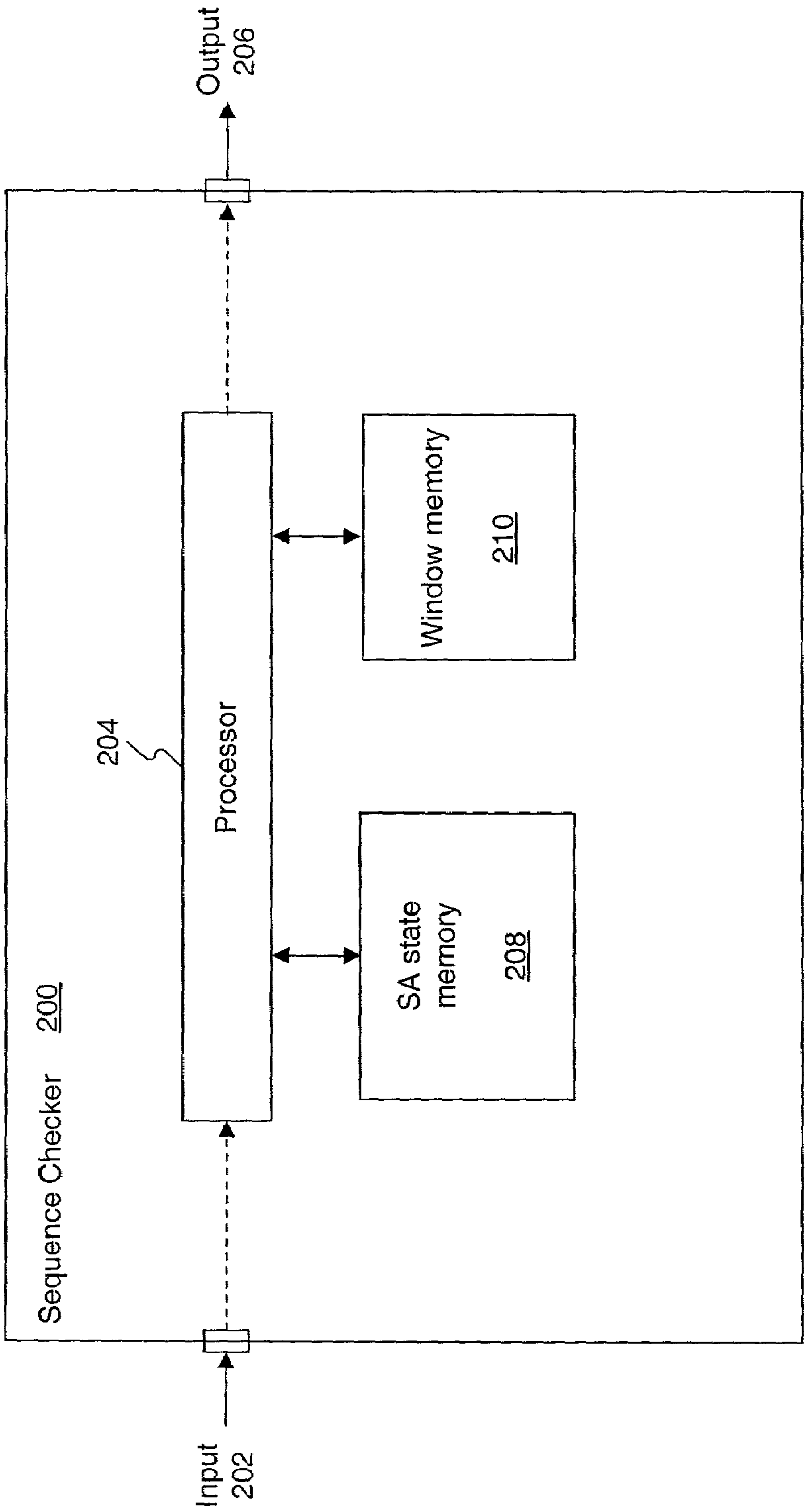
FIG. 2 shows a more detailed view of a sequence checker in accordance with the present invention.

FIG. 2 shows a more detailed view of a sequence checker in accordance with the present invention. As shown, a sequence checker 200 comprises an input port 202, a processor 204, an output port 206, a SA state memory 208, a window memory 210. Sequence checker 200 may be formed of any different combination of one or more components consistent with the principles of the present invention.

Input port 202 receives incoming packets, e.g., from network 104. For example, input port 202 may receive data packets associated with a particular SA from network 104. Input port 202 may then pass the data packets to processor 204. For purposes of illustration, sequence checker 200 is shown with one input port, e.g., input port 202. However, sequence checker 200 may be implemented with any number of input ports for receiving incoming packets.

Processor 204 controls and maintains the sliding window. In addition, processor 204 performs various operations on received data packets for sequence number checking. Processor 204 determines the sequence numbers of the received data packets. Processor 204 may then refer to SA state memory 208, window memory 210 to determine if the sequence number is valid (or invalid). The operation of processor 204 to determine if a sequence number is valid (or invalid) is described in detail with reference to FIG. 6. In one embodiment consistent with the present invention, processor 204 is implemented using hardware logic, such as a finite state machine with associated data path logic. Alternatively, processor 204 may be implemented as a central processing unit executing an operating system and software. The operating system and software may include instructions and data for task scheduling and memory access operations. Examples of the operating system and software include the UNIX operating system and the LINUX operating system.

SA state memory 208 provides storage space for indicating a state of a particular SA for incoming data packets received by processor 204. SA state memory 208 may include a variety of fields to indicate the state of a particular SA. For example, in one embodiment, SA state memory 208 includes fields for: the current sequence number for an incoming data packet; a window base address, e.g., within window memory 210; a window size code, e.g., to indicate a window size; and the bytes remaining in a SA lifetime, e.g., within window memory 210.

The size of each field may vary based upon a variety of factors, such as the number of bits accessed from SA state memory 208 during one access cycle. For example, the current packet sequence number and bytes remaining in SA lifetime fields may be allocated 64 bits. Alternatively, the current packet sequence number field may be truncated to 52 bits, e.g., to allow all of the fields to be read in a single access cycle. In addition, the window base address field may be allocated a bit size based upon the window size for a particular window size. For example, window base address field may be allocated 13 bits for an 8 kbit SA window size and 14 bits for a 16 kbit SA window size. However, other fields and bit allocation to the fields within SA state memory 208 are consistent with the principles of the present invention.

SA state memory 208 may be implemented using a wide variety of memory technologies. For example, as shown in FIG. 2, SA state memory 208 may be implemented external to processor 204, e.g., as a 4–8 Mbit static random access memory (SRAM) using 128-bit access. Alternatively, SA state memory 208 may be integrated within processor 204, e.g., as one or more blocks of on-chip memory using 64-bit access. However, SA state memory 208 may be implemented using any type of memory technology, such as, dynamic RAM, synchronous dynamic RAM, etc.

Window memory 210 provides storage space to indicate a state of a sliding window for a particular SA, e.g., the current top and bottom values for the window. Window memory 210 may include one or more component memories operating in conjunction as a single block of memory. For example, the component memories of window memory 210 may include an SRAM as part of a field programmable gate array in an application specific integrated circuit and one or more double data rate SRAMs. However, window memory 210 may be implemented using any of a wide variety of memory technologies. Window memory 210 is described in more detail with reference to FIG. 3.

Figure 3:
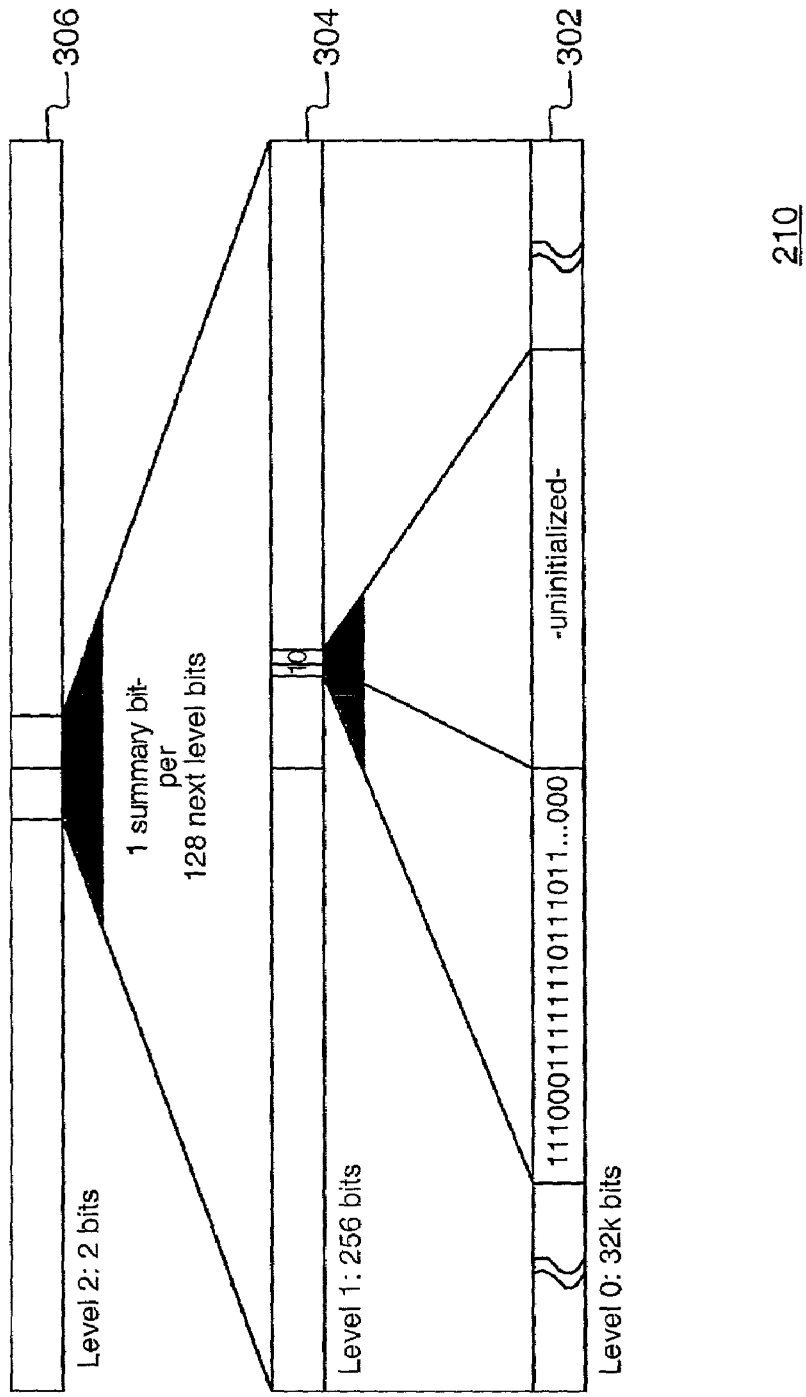
FIG. 3 shows a more detailed view of a window memory consistent with the principles of the present invention.

FIG. 3 shows a more detailed view of window memory 210 consistent with the principles of the present invention. Window memory 210 may be implemented using multiple levels, such as, a level-0 302, a level-1 304, and a level-2 306. In one embodiment, level-0 302 may be approximately 2 Mbits (e.g., $2^{21}$ bits) and contain 1 bit/packet, in groups of 128 bits. Level-1 304 may be approximately 16 Kbits ($2^{14}$ bits) and may contain 1 summary bit per 128 bits of level-0 302 memory, in groups of 2 to 128 bits. Level-2 306 may be 128 bits ($2^{7}$ bits), and contain 1 summary bit per 128 bits of level-1 304, in groups of 2 to 64 bits.

Level-0 302 may support 128-bit read and write accesses. Level-1 304 and level-2 306 may support read and write accesses in power-of-2 widths, e.g., from 2 to 128 bits wide using "masked" writes at level-1 304. In one embodiment, level-0 302 memory may be implemented using a DDR SRAM, and level-1 304 and level-2 306 may be implemented using on-chip memory or registers, e.g., within processor 204. In addition, level-0 302 and level-1 304 may be implemented without parity checking, since an error at level-0 302 or level-1 304 may generally be assumed to have a minimal impact, e.g, a single undetected replay (if a '1'becomes a '0'), or a small number of dropped packets (if a '0'becomes a '1').

For each window of an SA, level-0 302 stores the window state beginning at window base address, e.g., at window base address field of SA state memory 208. A contiguous sequence of bits may then be allocated to each SA at level-0 302, e.g., each allocation may be between 128 bits and 1 Mbit using increments in even powers of 2. At level-0 302, each window allocation for a particular SA may be aligned according to its size, e.g., a 128-bit window is aligned in 128-bit boundary increments, a 256-bit window is aligned in 256-bit boundary increments, etc. Subsequently, addressing for level-1 304 and level-2 306 may be based on the window base address and the log of the window size, e.g., as indicated by the window size code field in SA state memory 208. Thus, the window base address for level-0 302 can also be used to locate address bits at level-1 304 and level-2 306. In addition, the above addressing scheme allows a block to be partitioned into smaller size blocks, recursively, until a free block is created. Free blocks may then be put onto a list for each block size.

The state of bits at level-0 302 for a particular window of an SA may then be "summarized" using a multiple level bitmap using level-1 304 and level-2 306, as needed. Each summary bit has two states, e.g., (1) to indicate "valid" and (0) to indicate "invalid", to summarize a state of subsequent bits. In one embodiment consistent with the present invention, each bitmap uses two summary bits to summarize a state of 64 subsequent bits. Alternatively, each summary bit may summarize 128 bits. Any number of summary bits may be used in accordance with the principles of the present invention. For example, as shown in FIG. 3, a word of 128 bits at level-0 302 may have a corresponding summary bit at level-1 304, and each 128-bit word at level-1 304 may have a corresponding summary bit at level-2 306. The '1'bit indicates that the 128 corresponding level-0 302 bits have valid data; the '0' bit indicates that the corresponding level-0 302 word is currently uninitialized, and should be reset, e.g., to all-0. In addition, each summary bit may summarize any number of subsequent bits consistent with the principles of the present invention.

The number of summary bits used at level-1 304 or level-2 306 may depend on the window size and may be computed based on the window's base address and size. Although three levels are shown, summary bits at level-1 or level-2 may or may not be used, depending on the window size of the SA. For example, a window size of 128 bits does not require any summary bits in levels 1 and 2. A 256-bit window may be summarized using two adjacent level-1 304 summary bits, but does not require any level-2 306 bits. A 16 kbit window may be summarized using 128 summary bits at level-1 304, and does not require any summary bits at level-2 306. A 32 kbit window may be summarized using 256 bits at level-1 304, and two summary bits at level-2 306, and so on. Due to the alignment of blocks at level-0 302 (as described above), the summary bits in use at level-1 304 and level-2 306 may be assumed to avoid crossing word boundaries at level-0 302, unless whole words are in use for that window size. The following table shows the relationship of window size code, window size, memory levels in use, levels 0, 1, and 2 window base address bits in use, and summary bit field size/alignment.

Payload field 406 includes payload data being carried by data packet 400. ESP trailer 408 further comprises an optional padding field 416, a pad length field 418 and a next header field 420. Padding field 416 optionally provides padding. Padding length field 418 describes the length of padding used, if any. Next header field 420 is an 8-bit field that identifies the data contained in payload 406, e.g., IP-in-IP, TCP, or UDP. ESP Authentication field 410 is a variable length field which contains an integrity check value to ensure that portions of data packet 400 from ESP header 404 to ESP trailer field 408 are valid.

Figure 5:
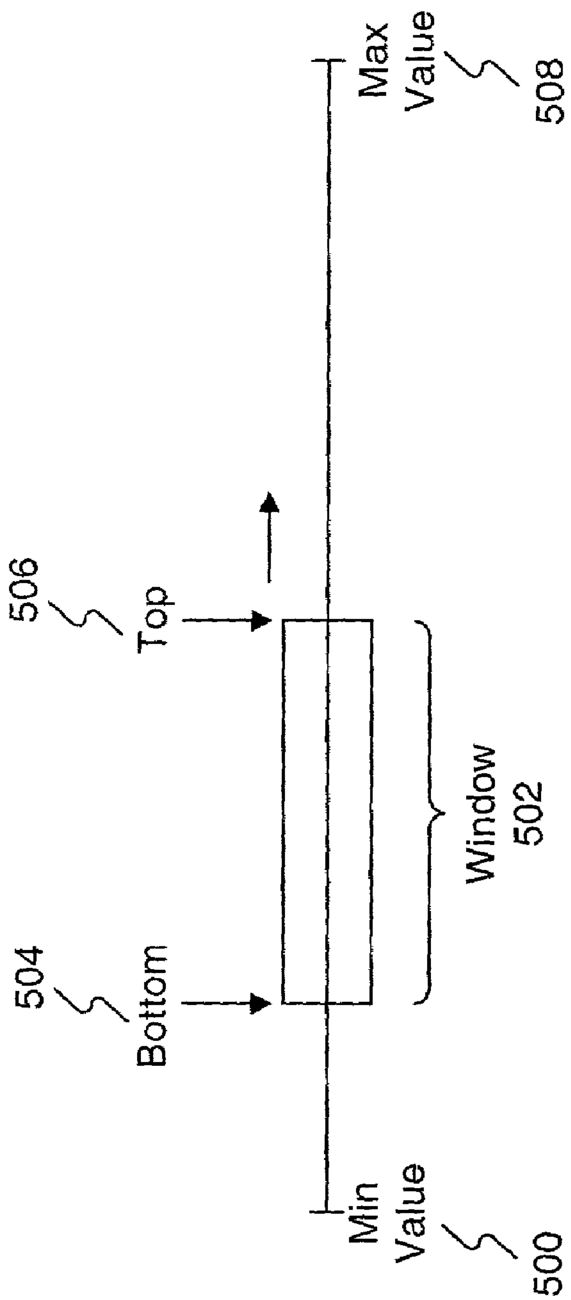
FIG. 5 illustrates a sliding window for maintaining a range of valid sequence numbers in accordance with the present invention.

FIG. 5 illustrates the concept of a "sliding window" for maintaining a range of sequence numbers in accordance with the present invention. In particular, a minimum value 500, window 502, and a maximum value 508 are shown. Window 502 further comprises a bottom value 504 and a top value 506. In one embodiment consistent with the present invention, minimum value 500 is set to 0, maximum value 508 is set to $2^{32}$. Window 502 may be set to any size, e.g., the difference between bottom value 504 and top value 506 may be a wide variety of values. For example, in one embodiment consistent with the principles of the present invention, window 502 may range in size from approximately 256 bits to approximately 1 megabit. A wide variety of values for minimum value 500, maximum value 508, and the window size may be used in accordance with the principles of the present invention.

Figure 6:
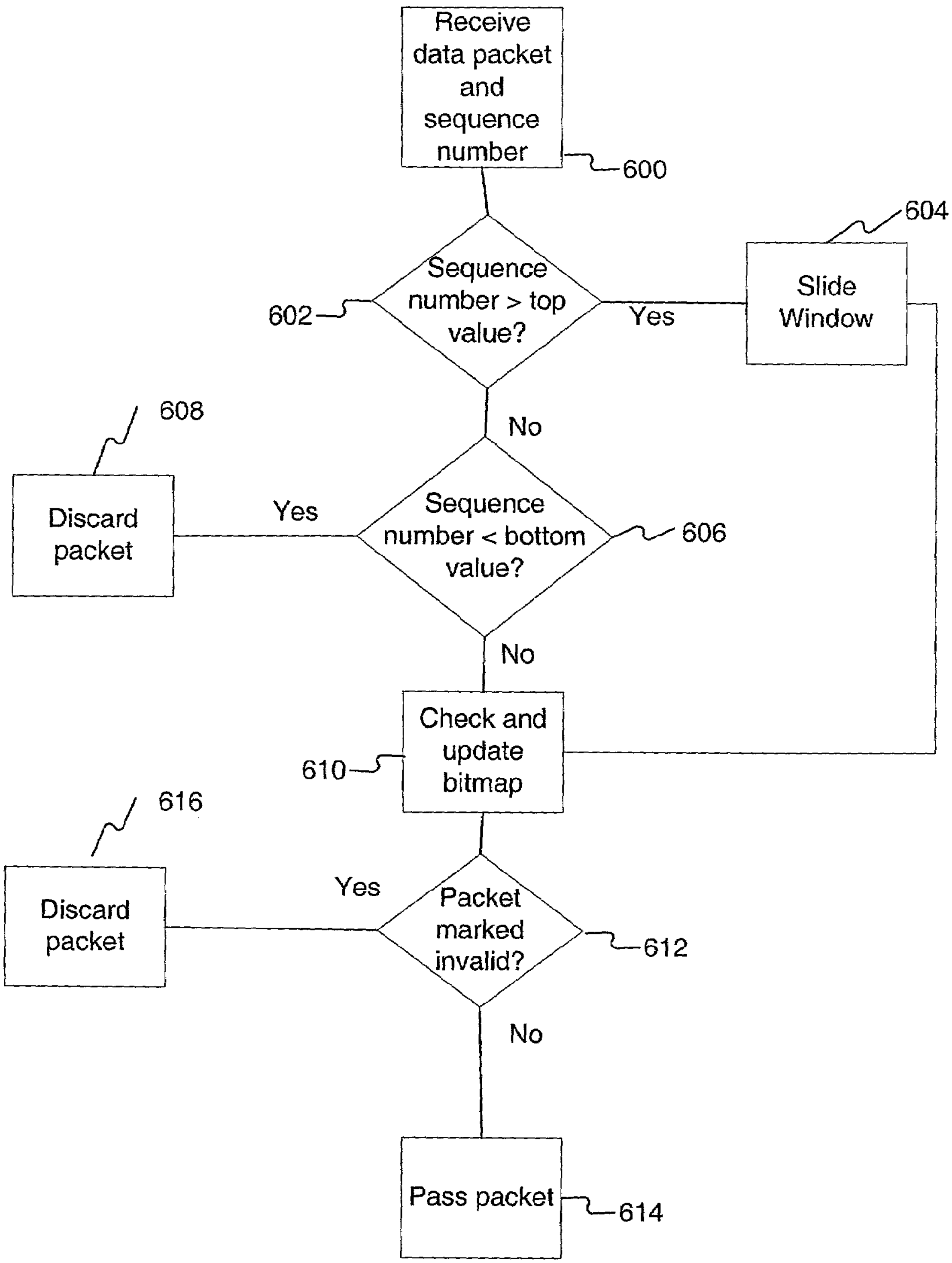
FIG. 6 shows a flow chart of the operation of maintaining a sliding window and checking sequence numbers in accordance with the present invention.

FIG. 6 shows a flow chart of the operation for maintaining a sliding window and checking sequence numbers in accordance with the present invention. In step 600, a sequence number is received from a data packet, e.g., data packet 400.

| Size Code | Window Size | Levels Used | Level 0 Word Address | Level 1 Word/Field Address | L1 Field Size/Align | Level 2 Field Address | L2 Field Size/Align |
|---|---|---|---|---|---|---|---|
| 0 | 128 | 0 | 13..0 | N/A | N/A | N/A | N/A |
| 1 | 256 | 0, 1 | 13..1 | 13..7/6..1 | 2 | N/A | N/A |
| 2 | 512 | 0, 1 | 13..2 | 13..7/6..2 | 4 | N/A | N/A |
| 3 | 1k | 0, 1 | 13..3 | 13..7/6..3 | 8 | N/A | N/A |
| 4 | 2k | 0, 1 | 13..4 | 13..7/6..4 | 16 | N/A | N/A |
| 5 | 4k | 0, 1 | 13..5 | 13..7/6..5 | 32 | N/A | N/A |
| 6 | 8k | 0, 1 | 13..6 | 13..7/6 | 64 | N/A | N/A |
| 7 | 16k | 0, 1 | 13..7 | 13..7 | 128 | N/A | N/A |
| 8 | 32k | 0, 1, 2 | 13..8 | 13..8 | 128 | 13..8 | 2 |
| 9 | 64k | 0, 1, 2 | 13..9 | 13..9 | 128 | 13..9 | 4 |
| 10 | 128k | 0, 1, 2 | 13..10 | 13..10 | 128 | 13..10 | 8 |
| 11 | 256k | 0, 1, 2 | 13..11 | 13..11 | 128 | 13..11 | 16 |
| 12 | 512k | 0, 1, 2 | 13..12 | 13..12 | 128 | 13..12 | 32 |
| 13 | 1M | 0, 1, 2 | 13 | 13 | 128 | 13 | 64 |
| 14 | <res.> | | | | | | |
| 15 | 0 | N/A | N/A | N/A | N/A | N/A | N/A |

Figure 4:
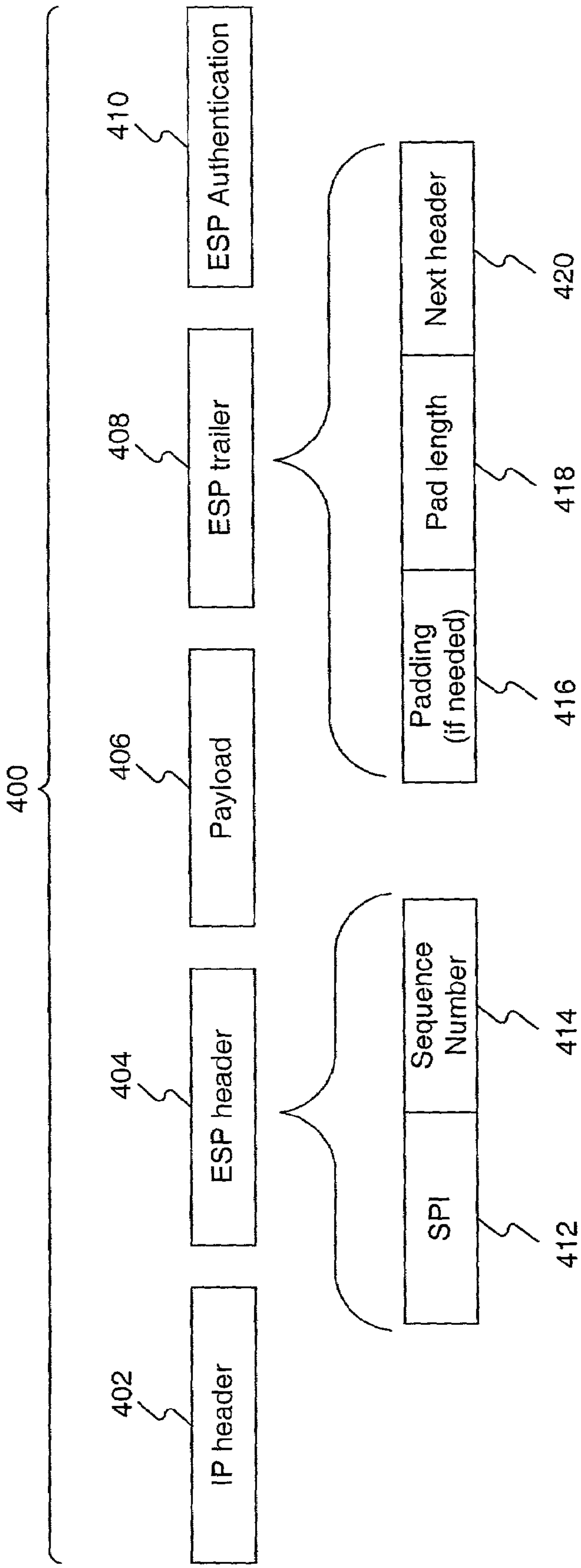
FIG. 4 illustrates a packet format for an IPsec packet consistent with an embodiment of the present invention.

FIG. 4 illustrates a packet format for an IPsec packet consistent with an embodiment of the present invention. In particular, a data packet 400 comprises an IP header 402, an ESP header 404, a payload 406, an ESP trailer 408, and an ESP authentication trailer 410.

ESP header 404 further comprises a security parameters index ("SPI") 412, and a sequence number field 414. SPI 412 is an arbitrary 32-bit value that, in combination with the destination IP address and security protocol, uniquely identifies an SA. Sequence number field 414 is an unsigned 32-bit field which contains a monotonically increasing sequence number. The sequence number field 414 is initialized to 0 when an SA is first established, and set to 1 when the first packet under the SA is sent.

For example, data packet 400 may be received via input port 202. Processor 204 may then receive the sequence number by examining sequence number field 414 of data packet 400. In addition, processor 204 may examine SPI field 412 to determine the SA associated with data packet 400. Processor 204 may then refer to SA state memory 208 to determine parameters for referencing window memory 208 assigned for the SA.

In step 602, the sequence number is checked to determine if it exceeds top value 506 of window 500. For example, processor 204 may refer to window memory 210 to retrieve top value 506 and compare it to the sequence number. If the sequence number exceeds top value 506, then processing flows to step 604.

In step 604, the sequence number exceeds top value 506 and, thus, processor 204 may set top value 506 to a value corresponding to the sequence number and calculate a new value for bottom value 504, e.g., processor 204 "slides" window 502. The new value for bottom value 504 is based on the window size. The window size for window 502 may be a fixed value such as 64 or 32 or may be varied, e.g., for each SA. The window size for window 500 may be varied based on the expected data rate (or packet rate) of the SA, or the expected maximum delay change associated with a packet reordering event in network 104. For example, a window size of 10,000 packets may be used for an SA with an expected data rate of 100 megabits per second (e.g., a packet rate of 100 kilopackets per second assuming 1 kilobit packets) and an expected packet reordering delay change of 100 milliseconds. In one embodiment consistent with the present invention, processor 204 sets top value 506 by setting summary bits in the bitmap, e.g., at level-2 306. For example, processor 204 may set one or more summary bits to "0" to indicate that the corresponding next level values, e.g., the intermediate and lower levels, are now invalid, and should be set to "0" at a later time (such as during step 610). Accordingly, by using multiple level bitmaps (e.g., level-2 306 and level-1 304) processor 204 may update window memory 210 using fewer memory operations than the window slide algorithm of RFC-2401. In one embodiment consistent with the present invention, processor 204 may update window memory 210 using a single memory operation, i.e., O(1) operations. Processing then flows to step 610 as described below.

If the sequence number does not exceed the top value 506, then processing flows to step 606. In step 606, the sequence number does not exceed top value 506 and the sequence number is checked to determine if it is less than bottom value 504. For example, processor 204 may refer to window memory 210 to retrieve bottom value 504 and compare it to the sequence number. If the sequence number is less than bottom value 504, then processing flows to step 608. In step 608, processor 204 marks data packet 400 as invalid. Sequence number checker 200 may then discard data packet 400, e.g., via output port 204 and may provide an alarm to indicate that data packet 400 was invalid.

If the sequence number is not less than bottom value 504, then processing flows to step 610. In step 610, processor 204 authenticates and checks the sequence number of data packet 400, and updates the multiple level bitmap, e.g., summary bits at level-2 316 and level-1 304. Processor 204 may authenticate data packet 400 before checking the sequence number. If data packet 400 fails authentication, then processor 204 may mark data packet as invalid without checking the sequence number. Alternatively, processor 204 may assume that data packet 400 is authenticated and proceed with checking the sequence number.

Processor 204 may check the sequence number of data packet 400 by creating a "current" bitmap based upon the sequence number. Processor 204 may then set bits at level-2 (and/or at level-1) based on the top level of the current bitmap. Processor 204 may then index levels of the current bitmap by dropping the lowest order bits of the sequence number according to the number of bits summarized by a single summary bit at the current level being indexed (e.g., the summary bits at level-2 306 or level-1 304). For example, if the current level being indexed summarizes $2^N$ bits of the lowest level for the current bitmap, then the lowest N bits of the sequence number may be dropped in the indexing operation. The lowest N bits may be dropped by shifting the sequence number right by N bits and discarding the fractional part of the result.

A summary bit of "1" indicates that the next level of the bitmap segment of subsequent bits corresponding to the indexed bit in the current bitmap is valid. Processor 204 may then proceed to the next level of the current bitmap, e.g., from level-2 306 to level-1 304. Upon processing reaching the lowest level of the current bitmap (e.g., level-0 302), a bit value of "1" indicates that the sequence number is a duplicate. Processor 204 may then mark data packet 400 as invalid, e.g., to cause data packet 400 to be discarded.

A summary bit of "0" indicates that the next level of the bitmap segment corresponding to the indexed bit in the current bitmap is invalid. Processor 204 may then set the summary bit to "1" and write "0" into the bitmap segment corresponding to the summary bit., e.g., a word at level-1 304. Processor 204 may then proceed to the next level of the current bitmap. Upon processing reaching the lowest level of the current bitmap (e.g., level-0 302), a bit value of "0" indicates that the sequence number is not a duplicate. Processor 204 may then mark data packet as valid, e.g., to cause data packet 400 to be passed.

By using multiple level bitmaps and summary bits, processor 204 may check and update bitmaps using fewer operations, i.e., O(log N) operations, where N is the window size. For example, by assuming that a cleared region of a bitmap is contiguous, e.g., when sliding window 502, summary bits may be used to indicate a state of subsequent bits. Accordingly, when data packets for an SA arrive sequentially in order, processor 204 may "slide" window 502 as data packets arrive using 3 operations (assuming a window size of 1000, a 32-bit wide memory, and each summary bit summarizes 32 bits). In contrast, the algorithm of RFC-2401 would require 32 memory operations under the same conditions. In accordance with the principles of the present invention, the use of summary bits may be extended to multiple levels and can be scaled easily to any window size.

In step 612, processor 204 checks the validity (or invalidity) of data packet 400. If data packet 400 is marked invalid then processing flows to step 616. In step 614, processor 204 discards data packet 400. If data packet 400 is marked valid (or not invalid), then processing flows to step 614. In step 614, processor 204 passes data packet 400, e.g., via output port 204 to its next destination.

For purposes of illustration, C++ code for a software implementation of one embodiment is included below. The exemplary software implementation is configured for a 32-bit wordsize. The 32-bit word length supports a 1000-packet window size with one level of summary bits, a 32 k window size with two levels of summary, and a 1M packet window size with three summary levels.

```
#include <stdlib.h>
#include <stream.h>
#include <iomanip.h>
// use 32-bit integers at each level
```

-continued

```
#define LOG_WORDSIZE 5
#define LOG_WORDSIZE_MASK (1 << LOG_WORDSIZE)−1
// if the level below *should* be empty, then the value on the summary
// level is 0, otherwise it's 1
// finding a 0 in the summary bit of interest, we set it to 1 and
// set the level below to EMPTY
#define EMPTY 0
typedef unsigned long * LevelPtr;
typedef unsigned long SequenceNumber;
int ChkReplayWindow(unsigned long seq);
class BigSequenceBitmap
{
    public:
        BigSequenceBitmap(SequenceNumber window);
        void set(SequenceNumber bitNum);
        int operator[ ](SequenceNumber bitNum);
        int check(SequenceNumber seq);
        SequenceNumber last( ) { return (highestSeen); }
    protected:
        SequenceNumber windowSize;
        SequenceNumber highestSeen;
    int nLevels;
    LevelPtr * level;
    // total size of the main bitmap (in bits)
    SequenceNumber mapSize( ) { return (1 << ((nLevels+1) * LOG_WORDSIZE)); }
    // bit number to look at for level lev containing bitNum
    // NOTE: wrapping mostly handled here
    SequenceNumber levelBit(int lev, SequenceNumber bitNum)
        { return ((bitNum % mapSize( )) >> ((nLevels-lev)*LOG_WORDSIZE)); }
    // invalidate top-level map from above lastValid to include newInvalid
    // if newInvalid maps to same bit as lastValid, then does nothing
    void invalidate(SequenceNumber lastValid, SequenceNumber newInvalid);
};
BigSequenceBitmap::BigSequenceBitmap(SequenceNumber window)
: highestSeen(0), windowSize(window)
{
    // the window must, worst-case, omit one toplevel bit's worth of
    // the bitmap size, since it would otherwise have active "seen" bits,
    // but would also need to have some regions invalidated
    // figure out how many levels in the tree
    nLevels = 0;
    int tmp = (windowSize−1) >> LOG_WORDSIZE;
    while (tmp > 0)
    {
        nLevels++;
        tmp >>= LOG_WORDSIZE;
    }
    cerr << "nLevels = " << nLevels << endl;
    tmp = mapSize( ); // size of bitmap
    tmp = tmp − (tmp >> LOG_WORDSIZE); // minus one top-level bit's worth
    if (tmp < windowSize) nLevels++; // need one more level (wasteful!)
    // allocate bitmaps for each level
    level = new LevelPtr[nLevels+1];
    int lev;
    for (lev=0; lev<=nLevels; lev++)
    {
        level[lev] = new unsigned long(1 << (lev * LOG_WORDSIZE));
        cerr << "level[" << lev << "] size is "
            << (1 << (lev * LOG_WORDSIZE)) << endl;
    }
    // the top level is empty, everything below is in an unknown state
    level[0][0] = EMPTY;
    set(0);           // 0 is an invalid value
}
void BigSequenceBitmap::set(SequenceNumber bitNum)
{
    int lev;
    SequenceNumber levBitNum;          // bit index value into level
    long levWord;          // word index into level
    int wordBit;          // bit index into word levWord points to
    int clearing = 0;          // set if clearing levels (saw a 0 summary bit)
    if (bitNum > highestSeen)
    {
        invalidate(highestSeen, bitNum); // repair summary maps
        highestSeen = bitNum;
    }
    // follow path down all the levels
    for (lev=0; lev<=nLevels; lev++)
    {
```

-continued

```
            // get the index into the bit array for the level
            levBitNum = levelBit(lev, bitNum);
            // now convert that to a word,bit pair
            levWord = levBitNum >> LOG_WORDSIZE;
            wordBit = levBitNum & LOG_WORDSIZE_MASK;
            // if the level above had a 0 summary bit, this level's state
            // is unknown for this word, and needs to be set EMPTY
            if (clearing)
                level[lev][levWord] = EMPTY;
            // if the summary bit for the next level is 0, we need to clear
            // all levels below
            if ((level[lev][levWord] & (1 << wordBit)) == 0)
                clearing = 1;
            //else;          // summary already 1
            // set the bit for the level
            level[lev][levWord] |= (1 << wordBit);
        }
}
int BigSequenceBitmap::operator[ ](SequenceNumber bitNum)
{
        int lev;
        SequenceNumber levBitNum; // bit index value into level
        long levWord;            // word index into level
        int wordBit;             // bit index into word levWord points to
        // follow path down all the levels, stopping if we see a 0 summary bit)
        for (lev=0; lev<=nLevels; lev++)
        {
            // get the index into the bit array for the level
            levBitNum = levelBit(lev, bitNum);
            // now convert that to a word,bit pair
            levWord = levBitNum >> LOG_WORDSIZE;
            wordBit = levBitNum & LOG_WORDSIZE_MASK;
            // if the summary bit for the next level is 0, we know the value is 0
            // in all levels below
            if ((level[lev][levWord] & (1 << wordBit)) == 0)
                return (0);
            //else;          // summary was 1, look at next level
        }
        // got to the bottom and tried to go down, so the bottom value was 1
        return (1);
}
int BigSequenceBitmap::check(SequenceNumber seq)
{
        if (seq == 0) return (0); // illegal or wrapped
        else if (seq > highestSeen) return (1); // always OK to be higher
        else if ((highestSeen - seq) >= windowSize) return (0); // out of window
        else if ((*this)[seq]) return (0); // replay
        return (1);
}
// invalidate top-level map from above lastValid to include newInvalid
// if newInvalid maps to same bit as lastValid, then it's already OK
void BigSequenceBitmap::invalidate(SequenceNumber lastValid,
                    SequenceNumber newInvalid)
{
        int bitNum;
        int firstBit = levelBit(0, lastValid);
        int lastBit = levelBit(0, newInvalid);
        if ((newInvalid - lastValid) >= windowSize) // entire map is now invalid
        {
            level[0][0] = EMPTY;
        }
        else if (firstBit > lastBit) // wrapped around top level
        {
            for (bitNum = firstBit+1; bitNum < (1 << LOG_WORDSIZE); bitNum++)
            {
                // zero bitNum in top level summary map
                level[0][0] &= ~(1 << bitNum);
            }
            for (bitNum = 0; bitNum <= lastBit; bitNum++)
            {
                // zero bitNum in top level summary map
                level[0][0] &= ~(1 << bitNum);
            }
        }
        else
        {
            for (bitNum = firstBit+1; bitNum <= lastBit; bitNum++)
            {
                    // zero bitNum in top level summary map
```

-continued

```
                    level[0][0] &= ~(1 << bitNum);
                }
            }
        }
        //---------------------------------------------------------------------------
        // Test program:
        unsigned long ReplayWindowSize = 31; // maximum 1-level window
        //unsigned long ReplayWindowSize = 1024-32; // maximum 2-level window
        BigSequenceBitmap bitmap(ReplayWindowSize);
        int main( )
        {
            int result;
            SequenceNumber current;
            cout << "last: " << bitmap.last( ) << endl;
            cout << "Input value to test (current:" << endl;
            while (1) {
                cin >> current;
                if (!cin.good( )) break;
                // note that check( ) doesn't update, so we can update after
                // authenticating
                result = bitmap.check(current);
            cout << (result ? "OK " : "BAD ");
            // we would authenticate packet here, if not done before
            // set( ) updates the bitmap and the highest sequence number, if
            // necessary
            if (result) bitmap.set(current);
            cout << " last: " << bitmap.last( ) << endl;
        }
        return 0;
}
```

Other embodiments and modifications consistent with the invention will be apparent to those skilled in the art from consideration of the specification and practice of the invention disclosed herein. For example, the disclosed methods and processes may be implemented in software and stored or transmitted using computer readable media such as random access memory, read only memory, magnetic disks, optical disks, or carrier wave signals (electrical or optical). In addition, the disclosed methods and processes may be implemented using a combination of one or more hardware components such as an integrated circuit, processor, reduced instruction set computer, etc. It is intended that the specification and examples be considered as exemplary only, with a true scope and spirit of the invention being indicated by the following claims.

What is claimed is:

1. A sequence number checker, comprising:

a bit map memory storing a first multiple level bit map representing a first sequence number of a first packet received by said sequence number checker; and a processor to compute a second multiple level bit map representing a second sequence number of a second packet received by said sequence number checker subsequent to said first packet, said second multiple level bit map being compared to said first multiple level bit map to produce a result indicating actions to be performed on said second packet.

2. The sequence number checker according to claim 1, further comprising:

a window controller to maintain a sliding window representing a range of sequence numbers; and a window memory storing a bottom value and a top value for said sliding window.

3. The sequence number checker according to claim 2, wherein said range of sequence numbers is a fixed size.

4. The sequence number checker according to claim 2, wherein said range of sequence numbers has a variable sized based upon characteristics of a security association.

5. The sequence number checker according to claim 1, wherein said bit map memory further comprises:

a partition assigned to said security association.

6. A method comprising:

determining characteristics of a security association, the characteristics including a window size, the determining including defining a multiple level bitmap representing sequence numbers of packets;

setting a bottom value and a top value to define a window based on said window size, said setting including setting at least one bit of the multiple level bitmap;

receiving a sequence number for a packet;

comparing said sequence number to said window, said comparison using the multiple level bitmap;

setting a new top value equal to said sequence number if said sequence number is greater than the said top value; and setting a new bottom value based on said new top value and said window size.

7. A method for maintaining a window of valid sequence numbers, comprising:

setting a bottom value and a top value to define a window;

receiving a sequence number for a packet;

comparing said sequence number to said window;

setting at least one summary bit in a multiple level bitmap, to set a new top value, if said sequence number is greater than said top value, wherein said at least one summary bit indicates a validity of a contiguous range of bits within said multiple level bitmap; and setting a new bottom value based on said new top value.

8. A method for checking sequence numbers, comprising:

receiving a sequence number for a packet;

converting said sequence number to a first multiple level bit map;

retrieving a second multiple level bit map stored in a bit map memory;

dividing said first multiple level bit map into a first plurality of summary bits;

dividing said second multiple level bit map into a second plurality of summary bits; and comparing said first and second plurality of summary bits to produce a result indicating validity of said sequence number.

9. The method according to claim 8, wherein said comparing step further comprises:

setting a value for at least one of said second plurality of summary bits based on said result; and setting a range of contiguous bits in said second multiple level bit map based on said result.

10. The method according to claim 9, wherein setting said range of contiguous bits in said second multiple level bit map comprises setting said range of contiguous bits to a value of 0 when at least one of said second plurality of summary bits changes from a value of 0 to a value of 1.

11. The method according to claim 9, further comprising:

passing said packet upon producing a result indicating said sequence number is valid.

12. The method according to claim 9, further comprising:

discarding said packet upon producing a result indicating said sequence number is invalid.

13. An apparatus for maintaining a window of valid sequence numbers, comprising:

means for setting a bottom value and a top value to define a window;

means for receiving a sequence number for a packet;

means for comparing said sequence number to said window;

means for setting at least one summary bit in a multiple level bitmap, to set a new top value, if said sequence number is greater than said top value, wherein said at least one summary bit indicates a validity of a contiguous range of bits within said multiple level bitmap; and means for setting a new bottom value based on said new top value.

14. An apparatus for checking sequence numbers, comprising:

means for receiving a sequence number for a packet;

means for converting said sequence number to a first multiple level bit map;

means for retrieving a second multiple level bit map stored in a bit map memory;

means for dividing said first multiple level bit map into a first plurality of summary bits;

means for dividing said second multiple level bit map into a second plurality of summary bits; and means for comparing said first and second plurality of summary bits to produce a result indicating validity of said sequence number.

* * * * *